June 16, 1942.    H. KLEMPERER ET AL    2,286,210
ARC WELDING SYSTEM AND METHOD
Filed Jan. 14, 1941
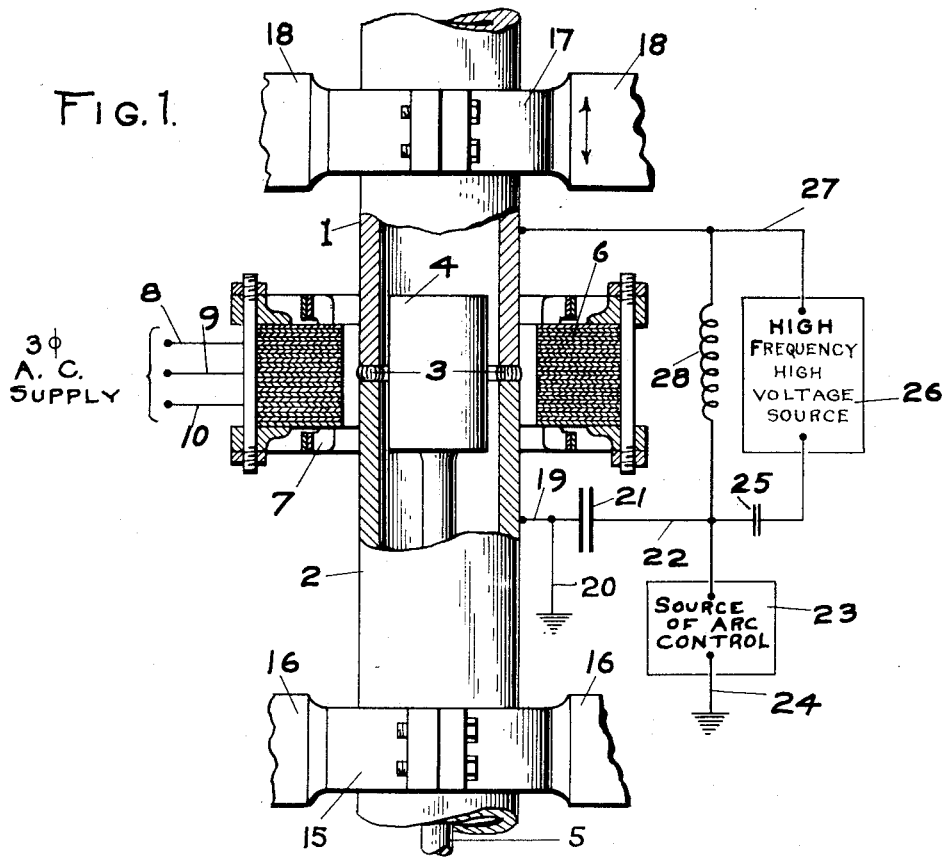
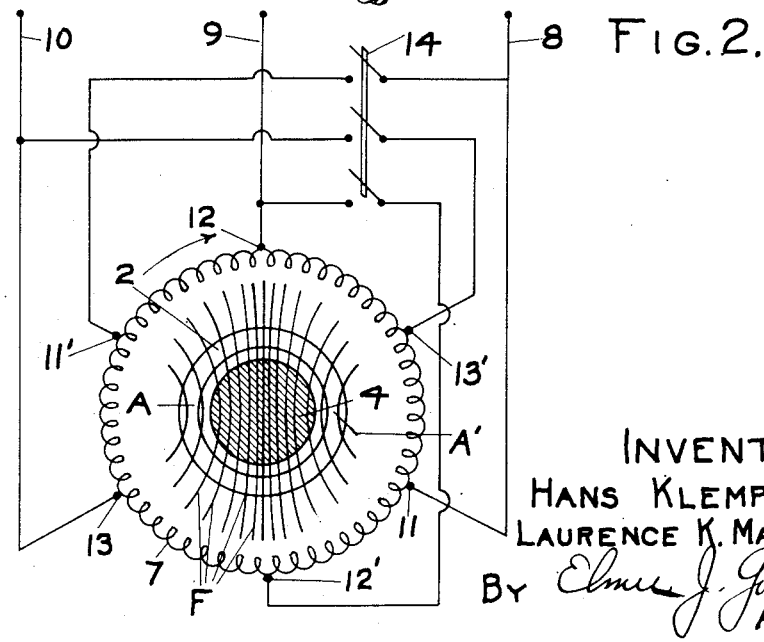
INVENTORS.
HANS KLEMPERER,
LAURENCE K. MARSHALL,
BY Elmer J. Gorn
ATTY.

Patented June 16, 1942

2,286,210

UNITED STATES PATENT OFFICE 2,286,210

ARC WELDING SYSTEM AND METHOD

Hans Klemperer, Belmont, and Laurence K. Marshall, Cambridge, Mass., assignors to Raytheon Manufacturing Company, Newton, Mass., a corporation of Delaware Application January 14, 1941, Serial No. 374,358

22 Claims. (Cl. 219—4)

This invention relates to a system and a method for producing welding by means of an electric arc.

An object of this invention is to devise a system and a method in which an electric arc is dispersed or moved over a relatively extended surface to produce substantially uniform heating of said extended surface whereby a good weld may be produced throughout said surface.

Another object is to distribute the heat of an arc over an extended surface by moving said arc over said surface whereby said heat is caused to penetrate into the work without excessive surface heating.

Another object is to control the speed at which the arc is moved.

A still further object is to produce such motion or dispersion by subjecting the arc to a magnetic field.

The foregoing and other objects of this invention will be best understood from the following description of an exemplification thereof, reference being had to the accompanying drawing wherein:

Fig. 1 is a cross sectional view of an apparatus for carrying out the invention, together with a diagrammatic circuit of the associated system; and Fig. 2 is a diagrammatic representation of the magnetic field on one of the surfaces to be welded together with a diagrammatic representation of the associated circuit for energizing the magnetic field windings.

In the drawing, two metal bodies 1 and 2 which are shown in the form of tubes or pipes are to be welded to each other along their adjacent edges so as to form a continuous tube or pipe. The pipes 1 and 2 are held spaced apart so as to provide an annular gap 3 in which a welding arc is to be established. A core 4 of magnetic material is inserted inside the pipes 1 and 2 so as to bridge the gap 3 for the purpose of assisting in the proper formation of the magnetic field in the gap 3. In order to avoid excessive eddy currents in the core 4, said core may be made of laminated magnetic material. The core 4 may be carried by a support rod 5 so that said core may be inserted from an open end of the pipe 2 and supported in proper position adjacent the gap 3. Surrounding the pipes 1 and 2 at the gap 3 is a magnetic core structure 6 formed preferably of laminations of magnetic material. The magnetic core structure 6 is of annular form and presents an annular pole face to the gap 3. In said annular pole face is placed a winding 7. This winding is disposed in such a way that when supplied with polyphase alternating current a magnetic field extending transversely across the gap 3 and rotating therein substantially in synchronism with the alternating current flowing in the winding 7 is produced. For example, the winding 7 may be disposed in continuous form and wound as in the stator of an induction motor. Other ways of arranging the exciting winding 7 will readily suggest themselves to those skilled in the art. In order to supply the winding 7 with alternating current, three lines 8, 9 and 10 connected to the winding 7, as will be described below, are provided and adapted to be connected to a suitable source of three phase alternating current.

As diagrammatically indicated in Fig. 2, the winding 7 is disposed as a continuous winding and is provided with taps 11, 12 and 13 to which the lines 8, 9 and 10 respectively are connected. Thus when said lines are energized from a three phase alternating current source, a magnetic field as indicated by the lines F is created across the adjacent faces of the pipes 1 and 2 in the gap 3. The field F is somewhat stronger at its central portion and becomes weaker as it extends out to the sides. The said field also rotates in the plane of the drawing in a direction as, for example, indicated by the arrow in Fig. 2 in synchronism with the alternating current supplied to the lines 8, 9 and 10. It is often desirable to provide means for regulating the speed of rotation of the magnetic field F. One way in which this may be done is to provide the winding 7 with an additional set of taps 11', 12' and 13', said taps being located diametrically opposite the taps 11, 12 and 13, respectively. By means of a switch 14, each diametrically opposite pair of taps may be interconnected. By this arrangement the speed of rotation of the magnetic field F is halved. Other ways of controlling the speed of rotation of the magnetic field can be utilized as, for example, by having the lines 8, 9 and 10 supplied with alternating current of variable and controlled frequency.

In order to hold the pipes 1 and 2 in position, the lower pipe 2 may be securely held in a clamp 15 which is rigidly held in place by stationary base members 16—16. The upper pipe 1 may be held by a clamping member 17 supporting the movable members 18—18. The movable members 18—18 are adapted to hold the pipes 1 and 2 separated by a predetermined amount, during the heating by the arc, and to move the lower end of the pipe 1 into intimate engagement with the upper end of the pipe 2 when heating has been completed and welding of the pipes is to be produced.

The pipe 2 has electrically connected thereto a conductor 19 which is grounded at 20. The conductor 19 also extends to one side of a relatively large condenser 21. The other side of said condenser 21 is connected by means of a connection 22 to one terminal of a suitable source of arc current 23, the other terminal of which is grounded at 24. The source 23 may supply current of any suitable nature which may be in the form of direct current, alternating current, or any specialized form particularly adapted for the purpose for which it is to be used. The connector 22 also extends to one side of a relatively small condenser 25, the other side of which is connected to one terminal of a relatively high frequency high voltage source 26. The other terminal of said source 26 is connected by means of a conductor 27 to the pipe 1. An air core choke 28 is connected between the conductor 28 and the connection 22. The source 26 is of sufficiently high voltage to produce sparking through the gap 3 between the pipes 1 and 2 so as to initiate the welding arc. The said source 26 is also of sufficiently high frequency to be substantially by-passed around the source 23 by the condenser 21 and to have the choke 28 present a relatively high impedance to the current supplied from said source 26.

When the system described above is energized, the source 26 impresses a voltage across the gap 3 which is sufficient to cause sparks to jump between the pipes 1 and 2 in said gap. Due to the large condenser 21, very little voltage drop due to the source 26 is produced across said condenser and therefore very little high frequency voltage is set up across the source 23. In this way the current from the source 26 is substantially prevented from being fed into the source 23. The choke 28, however, presents a relatively high impedance to the source 26 and therefore enables the high voltage drop necessary to cause sparks to jump through the gap 3 to exist across said choke. When the sparks due to the source 26 occur, the current supplied from the source 23 causes the sparks to progress into an arc in the gap 3. An "arc" in the sense as used in the specification and claims is an electrical space discharge which occurs between two separated surfaces of sufficient intensity to produce substantial heating of the surfaces between which the discharge passes. As previously indicated, the condenser 21 is relatively large. However, the condenser 21 should not be so large as to by-pass excessive amounts of current from the source 23 although the by-pass of substantial amounts of current in this manner is permissible. The condenser 25, however, is sufficiently small to present a relatively high impedance to the current from the source 23 thus preventing said source from feeding substantial amounts of current through the source 26. The choke 28, however, presents relatively low impedance path for the current of the source 23 and thus permits the relatively large arc current to pass freely through said choke 28.

Referring to Fig. 2, it will be seen that if an arc occurs at any place on the end of the pipe 2 but the side portions A or A₁, the relation of the magnetic field to the arc current is such as to move the arc around to either A or A₁ where said arc continues to run. It may be that in some conditions two arcs will be created, running in parallel at A and A₁. This relationship between the location of the arc and the magnetic field is substantially preserved as the magnetic field rotates, so that during such rotation the arc likewise rotates in substantial synchronism with the magnetic field. Under some conditions, it may be possible to produce a slip between the magnetic field and the arc so that said arc does not rotate in synchronism with the magnetic field. This slip may be regulated by controlling the magnitudes of the magnetic field and of the arc current. This, therefore, introduces another manner in which the speed of rotation of the arc may be varied in addition to the regulation of the speed of rotation of the magnetic field as described above.

It will be noted that as described above, the direction of rotation of the arc is determined by the direction of rotation of the magnetic field and not by the nature of the current. Furthermore, in those cases where the arc rotates in synchronism with the magnetic field, the speed of rotation is likewise independent of the arc current. Therefore, the present invention provides for independent control of the nature and value of the arc current as well as of the speed and direction of rotation of the arc.

This invention lends itself to very accurate control of the conditions and factors at the welding surfaces. In order for the proper amount of metal at the welding surface to be raised to welding temperature, it is necessary that energy be fed to said surface at a predetermined rate. Where relatively extended surfaces are to be welded, and an attempt were made to feed the requisite amount of energy to said surfaces by means of an ordinary arc, a tendency might exist for the arc to localize on portions of the surface to be welded and produce an uneven heating of said surface with an excessive fusing of the metal in certain parts and an insufficient heating of the metal in others. These and other effects introduce uncontrollable factors in the use of an ordinary arc for such welding. In accordance with the present invention, however, such factors are under complete control. For example, by adapting the rate of energy input to the arc in accordance with the surface area to be welded, this energy is distributed uniformly over the entire area by the action of the magnetic field in dispersing or moving the arc as described above. Further by selecting the proper area to which the arc is subjected or by regulating the amount of current in the arc, or both, the degree of fusing of the surface and the depth of penetration of the heating can be accurately controlled. The magnetic field, in addition to dispersing or moving the arc as described above, also tends to increase the voltage drop to the arc thus increasing the amount of energy which can be liberated with a given amount of arc current. This is desirable since the size of equipment for supplying arc current is controlled largely by the amount of current which it is called upon to deliver. If any predetermined spot on the surface heated in accordance with the present invention is considered, it will be seen that an arc spot is established which is periodically removed and returned to said spot. The rate of heating of said localized spot depends on the amount of energy in the arc and the rate at which said arc returns to said spot. As previously described, both of these factors are under complete control in the present invention. Other variations in the conditions at the welding surfaces might be produced. For example, instead of operating the arc in air, gap 3 could be immersed in any other suitable gaseous atmosphere, such as hydrogen, or might even be evacuated.

Of course it is to be understood that this invention is not limited to the particular details as described above as many equivalents and variations will suggest themselves to those skilled in the art. For example, instead of having the magnetic field rotatable by means of alternating current fed to a stationary winding, the magnetic structure creating the field could itself be rotated or the pipes could be rotated relative to a stationary magnetic structure. Certain aspects of this invention might be utilized whenever it is desired to heat relatively extended surfaces for any desired purpose. Instead of applying the invention to the welding of pipes, other objects having various shapes can be welded by utilizing the principles of the invention. In many instances, it is not necessary that the arc be moved through circular or closed paths. It is accordingly desired that the appended claims be given a broad interpretation commensurate with the scope of the invention within the art.

What is claimed is:

1. A system for heat-processing a member along and throughout a predetermined extended length of wall thereof, the entire predetermined extended length of which is to be heat-processed, the system having, in combination, means for holding the member, means for holding a second member with a wall thereof disposed adjacent to the first-named wall but separated at all points from the first-named wall by a gap, means for striking an arc in the gap and for maintaining said arc while the walls are held separated from each other, and means operable while the walls are held separated from each other for producing a magnetic field in said gap and configured to cause said arc to assume a predetermined position with respect to said field and for moving said field relative to said extended length for moving the arc in the gap rapidly along and throughout the predetermined extended length to heat the wall of the first-named member rapidly along and throughout the predetermined extended length.

2. A system for welding together two members each provided with a wall having, in combination, means for holding the members so that the walls shall be disposed adjacent to each other throughout a predetermined extended length but with the walls separated from each other at all points of the predetermined extended length by a gap, means for impressing opposite potentials upon the members to produce an arc in the gap while the walls are held separated from each other, means operable while the walls are held separated from each other for establishing in the gap a magnetic field configured to cause said arc to assume a predetermined position with respect to said field and for moving said field relative to said extended length to cause the arc to travel in the gap along and throughout the predetermined extended length with sufficient rapidity and a sufficient number of times to heat the walls substantially uniformly throughout the predetermined extended length, and means for pressing the members relatively toward each other to close the gap and bring the heated walls into tight engagement, thereby to cause the members to become welded to each other.

3. A system for heat-processing a member along and throughout a predetermined extended length of a wall thereof, the entire predetermined extended length of which is to be heat-processed, the system having, in combination, means for holding the member, means for holding a second member with a wall thereof disposed adjacent to the first-named wall but separated at all points from the first-named wall by a gap, means for striking an arc in the gap and for maintaining said arc while the walls are held separated from each other, windings for producing a magnetic field in said gap configured to cause said arc to assume a predetermined position with respect to said field, and means for energizing said windings with alternating current to cause said field to rotate substantially in synchronism with said current for moving the arc in the gap rapidly along and throughout the predetermined extended length to heat the wall of the first-named member rapidly along and throughout the predetermined extended length.

4. A system for heat-processing a member along and throughout a predetermined extended length of a wall thereof, the entire predetermined extended length of which is to be heat-processed, the system having, in combination, means for holding the member, means for holding a second member with a wall thereof disposed adjacent to the first-named wall but separated at all points from the first-named wall by a gap, means for striking an arc in the gap and for maintaining said arc while the walls are held separated from each other, means operable while the walls are held separated from each other for producing a magnetic field in said gap and configured to cause said arc to assume a predetermined position with respect to said field and for moving said field relative to said extended length for moving the arc in the gap rapidly along and throughout the predetermined extended length to heat the wall of the first-named member rapidly along and throughout the predetermined extended length, and means to control the speed of travel of the arc.

5. A system for heat-processing a member along and throughout a predetermined extended length of a wall thereof, the entire predetermined extended length of which is to be heat-processed, the system having, in combination, means for holding the member, means for holding a second member with a wall thereof disposed adjacent to the first-named wall but separated at all points from the first-named wall by a gap, means for striking an arc in the gap and for maintaining said arc while the walls are held separated from each other, windings for producing a magnetic field in said gap configured to cause said arc to assume a predetermined position with respect to said field, means for energizing said windings with alternating current to cause said field to rotate substantially in synchronism with said current for moving the arc in the gap rapidly along and throughout the predetermined extended length to heat the wall of the first-named member rapidly along and throughout the predetermined extended length, and means to control the speed of travel of the arc.

6. A method of heating a member along and throughout a predetermined extended length thereof, the entire predetermined length of which is to be heated, such method comprising striking an arc on a portion of the predetermined length of the member, establishing a magnetic field for moving the arc rapidly along and throughout the predetermined length to heat the member rapidly throughout the predetermined length, and controlling the magnetic field to control the speed of travel of the arc.

7. A system for heat-processing a member along and throughout a predetermined extended length of a wall thereof the entire predetermined extended length of which is to be heat-processed, the system having, in combination, means for holding the member, means for holding a second member with a wall thereof disposed adjacent to the first-named wall but separated at all points from the first-named wall by a gap, means for striking an arc in the gap while the walls are held separated from each other, and means operable while the walls are held separated from each other for moving the arc in the gap rapidly along and throughout the predetermined extended length to heat the wall of the first-named member rapidly along and throughout the predetermined extended length.

8. A system for heat-processing a member along and throughout a predetermined extended length of a wall thereof the entire predetermined extended length of which is to be heat-processed, the system having, in combination, means for holding the member, means for holding a second member with a wall thereof disposed adjacent to the first-named wall but separated at all points from the first-named wall by a gap of substantial length, means for striking an arc in the gap while the walls are held separated from each other, and means operable while the walls are held separated from each other for establishing in the gap a magnetic field having a substantial component at right angles to the length dimension of the gap to cause the arc to travel in the gap rapidly along and throughout the predetermined extended length to heat the wall of the first-named member rapidly along and throughout the predetermined extended length.

9. A machine for welding together two annular members along their end walls having, in combination, means for holding the annular members with their end walls adjacently disposed and separated by a gap, means for striking an arc between the adjacently disposed end walls while separated by the gap, means for moving the arc rapidly along and throughout the peripheral extent of the end walls to heat the end walls rapidly throughout their peripheral extent, and means for applying pressure to the heated end walls to cause the end walls to become welded to each other.

10. A method of welding a member along an extended wall thereof that comprises positioning a similarly extended wall adjacent to the wall of the member but separated at all points therefrom by a gap of substantial length, striking an arc in the gap while the walls are held separated from each other, establishing in the gap a magnetic field having a substantial component at right angles to the length dimension of the gap while the walls are held separated from each other to cause the arc to travel in the gap rapidly along and between the extended walls with the terminals of the arc always engaging the respective walls to heat the member rapidly along and throughout the extent of its extended wall, and welding the member along its heated extended wall.

11. A method of heat-processing two annular members that comprises positioning the members so that their end walls are adjacently disposed but not in contact, striking an arc between the adjacently disposed non-contacting end walls, and establishing a magnetic field having a substantial component radially of the annular members to cause the arc to travel rapidly along and throughout the peripheral extent of the end walls.

12. A method of heat-processing a member along and throughout a predetermined extended length of a wall thereof the entire predetermined extended length of which is to be heat-processed, the method comprising holding a second member with a wall thereof disposed adjacent to the first-named wall throughout the predetermined extended length but separated at all points from the first-named wall by a gap, striking an arc in the gap while the walls are held separated from each other with the terminals of the arc engaging the respective walls, and, while the walls are held separated from each other and while the terminals of the arc are maintained in engagement with the respective walls, moving the arc in the gap along and throughout the predetermined extended length with sufficient rapidity and a sufficient number of times to heat the first-named wall substantially uniformly throughout the predetermined extended length.

13. A system for operating on a member having faces connected along the thickness dimension of the member by an end wall to heat-process the member along and throughout a predetermined extended length of the end wall, the system having, in combination, means for holding the member, means for holding a second member with a wall thereof disposed adjacent to the end wall throughout the said predetermined extended length but separated at all points from the end wall by a gap, means for impressing opposite potentials upon the members to produce an arc in the gap while the walls are held separated from each other, and means operable while the walls are held separated from each other for moving the arc in the gap along and throughout the predetermined extended length with sufficient rapidity and a sufficient number of times to heat the end wall substantially uniformly throughout the predetermined extended length.

14. A system for operating on two members each having faces connected along the thickness dimensions of the members by an end wall to heat-process the members along and throughout a predetermined extended length of the end walls, the system having, in combination, means for holding the members with their end walls adjacently disposed but non-contacting throughout the said predetermined extended length, means for striking an arc between the adjacently disposed non-contacting end walls with the terminals of the arc engaging the respective end walls, and means operable while the walls are non-contacting and while the terminals of the arc are maintained in engagement with the respective end walls for moving the arc along and throughout the predetermined extended length with sufficient rapidity and a sufficient number of times to heat the non-contacting end walls substantially uniformly throughout the predetermined extended length.

15. A method of heat-processing a member along and throughout a predetermined extended length of a wall thereof the entire predetermined extended length of which is to be heat-processed, the method comprising a holding a second member substantially stationary relative to the first-named member with a wall thereof disposed adjacent to the first-named wall throughout the said predetermined extended length but separated at all points from the first-named wall by a gap, striking an arc in the gap while the walls are held separated from each other, and, while the walls are held separated from each other, moving the arc in the gap along and throughout the predetermined extended length with sufficient rapidity and a sufficient number of times to heat the first-named wall substantially uniformly throughout the predetermined extended length.

16. A method of welding a member along an extended wall thereof that comprises holding a second member with a wall thereof disposed adjacent to the extended wall but separated at all points from the extended wall by a gap, striking an arc in the gap while the walls are held separated from each other with the terminals of the arc engaging the respective walls, while the walls are held separated from each other and while the terminals of the arc are maintained in engagement with the walls moving the arc in the gap along and throughout the extended wall with sufficient rapidity and a sufficient number of times to heat the extended wall throughout its extent, and welding the member along its heated extended wall.

17. A method of welding together two members each provided with a wall comprising holding the members so that the walls shall be disposed adjacent to each other but non-contacting throughout a predetermined extended length, striking an arc between the adjacently disposed non-contacting walls with the terminals of the arc engaging the respective walls, while the walls are non-contacting and while the terminals of the arc are maintained in engagement with the respective walls moving the arc along and throughout the predetermined extended length with sufficient rapidity and a sufficient number of times to heat the walls substantially uniformly throughout the predetermined extended length, and welding the members along the heated walls.

18. A machine for welding together two members each provided with a wall having, in combination, means for holding the members so that the walls shall be disposed adjacent to each other throughout a predetermined extended length but with the walls separated from each other at all points of the predetermined extended length by a gap, means for impressing opposite potentials upon the members to produce an arc in the gap while the walls are held separated from each other, means operable while the walls are held separated from each other for moving the arc in the gap along and throughout the predetermined extended length with sufficient rapidity and a sufficient number of times to heat the walls substantially uniformly throughout the predetermined extended length, and means for pressing the members relatively toward each other to close the gap and bring the heated walls into tight engagement, thereby to cause the members to become welded to each other along the heated walls.

19. A machine for welding together two members each provided with a wall having, in combination, means for holding the members so that the walls shall be disposed adjacent to each other throughout a predetermined extended length but with the walls separated from each other at all points of the predetermined extended length by a gap, means for impressing opposite potentials upon the members to produce an arc in the gap while the walls are held separated from each other, means operable while the walls are held separated from each other for establishing in the gap a magnetic field having a substantial component at right angles to the length dimension of the gap to cause the arc to travel in the gap along and throughout the predetermined extended length with sufficient rapidity and a sufficient number of times to heat the walls substantially uniformly throughout the predetermined extended length, and means for pressing the members relatively toward each other to close the gap and bring the heated walls into tight engagement, thereby to cause the members to become welded to each other.

20. A system for heat-processing a member along and throughout an extended closed-path portion thereof, the entire extended closed-path portion of which is to be heat-processed, having, in combination, means for holding the member, means for holding a second member with a portion thereof disposed adjacent to the closed-path portion throughout the closed-path portion but separated at all points from the closed-path portion by a gap, means for impressing opposite potentials upon the members to produce an arc in the gap while the walls are held separated from each other, and means operable while the walls are held separated from each other for moving the arc in the gap along and throughout the closed-path portion with sufficient rapidity and a sufficient number of times to heat the closed-path portion substantially uniformly throughout the closed-path portion.

21. A system for heat-processing an end wall of an annular member having, in combination, means for holding the member, means for holding a second member with a wall thereof disposed adjacent to the end wall throughout the peripheral extent of the end wall but separated at all points of the end wall by a gap, means for impressing opposite potentials upon the members to produce an arc in the gap while the walls are held separated from each other, and means operable while the walls are held separated from each other for moving the arc in the gap along and throughout the periphery of the end wall with sufficient rapidity and a sufficient number of times to heat the end wall substantially uniformly throughout its peripheral extent.

22. A method of heat-processing two annular members that comprises positioning the members so that their end walls shall be adjacently disposed but not in contact, striking an arc between the adjacently disposed non-contacting end walls with the terminals of the arc engaging the respective end walls, and, while the end walls are non-contacting, and while the terminals of the arc are maintained in engagement with the respective end walls, moving the arc along and throughout the peripheries of the end walls with sufficient rapidity and a sufficient number of times to heat the non-contacting end walls substantially uniformly.

HANS KLEMPERER.
LAURENCE K. MARSHALL.